April 1, 1930.   E. R. TIETZ   1,752,819
AUTOMOBILE WHEEL
Filed Sept. 20, 1926
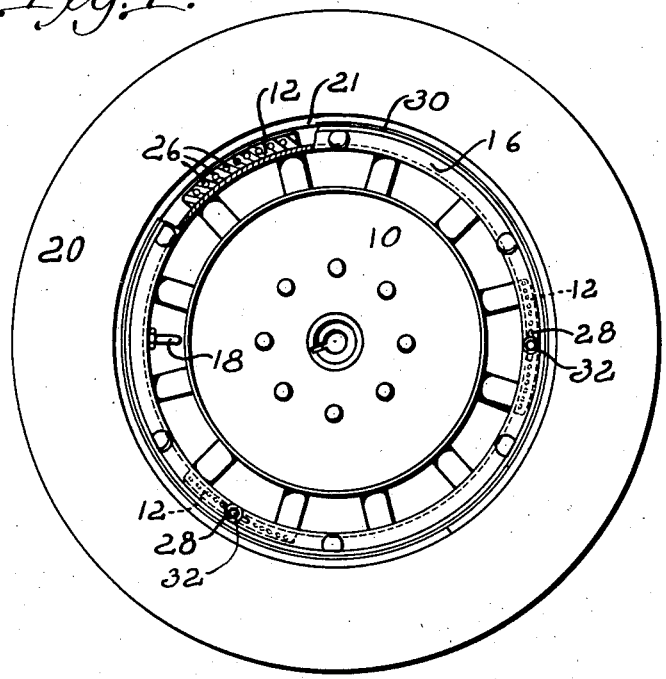
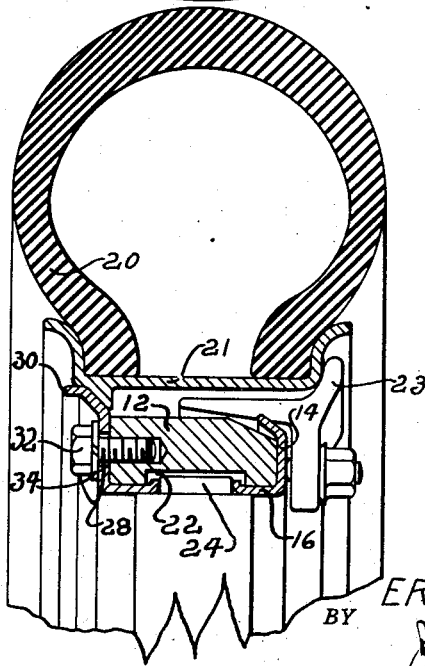
INVENTOR
ERNEST R. TIETZ.
BY
ATTORNEY Patented Apr. 1, 1930

1,752,819

UNITED STATES PATENT OFFICE

ERNEST R. TIETZ, OF DETROIT, MICHIGAN

AUTOMOBILE WHEEL

Application filed September 20, 1926. Serial No. 136,476.

This invention relates to a wheel balance and more particularly to a means for balancing the unbalanced forces of an automobile wheel and tire.

In the manufacture of automobile wheels and tires, there are certain portions of each which are heavier than other portions and in the use of pneumatic tires the valve stem and its associated parts cause the wheel to rotate irregularly. It is therefore an object of this invention to add weights to the wheel which may be moved circumferentially to compensate for the unbalanced forces.

Another object of the invention is to mount the weights within the channel of a felloe between the tire rim and felloe.

A further object is to construct the weights in such a manner that they may be adjusted externally of the felloe, either by moving the whole weight circumferentially or by moving certain portions thereof in the same or opposite direction.

Another object is to provide a balance for the tire on the wheel and the unbalanced forces of each in relation to one another may be compensated without disassembling or removing the tire or rim.

Other objects will more fully appear from the following description taken in connection with the accompanying drawings, in which:

Fig. 1 is a side elevation of a wheel, part broken away, showing one adaptation of my improved balancing means.

Fig. 2 is a sectional view on line 2—2 of Fig. 1.

In the illustrated embodiment of my invention, a wheel 10 has been provided with weights 12 located in the channel 14 of a felloe 16. Three weights have been shown equally spaced around the circumference of the wheel, radially between a tire 20 having the usual tire rim 21 and felloe 16 one weight has been arranged diametrically opposite the valve stem 18 of a tire 20 and each of the other two has been arranged between the valve stem and the first mentioned weight, one on either side of the wheel. Lugs 23 secure the tire rim on the felloe.

In the form shown in Figs. 1 and 2 each weight is formed of a block section conforming to the circumference of the felloe and adapted to have a sliding fit in the channel 14 of the felloe. When the weights are used on spoked wheels, illustrated by the drawing, a channel 22 in the under surface of the weight 10 permits the weight to slide around the felloe without interference with the radially projecting spoke ends 24. A plurality of screw threaded apertures 26 are formed in one side of the weight and a slot 28 in one flange of the felloe, preferably the inner flange 30, through which a bolt 32 extends to engage one of the screw threaded apertures 26. An opening of sufficient size to receive the bolt 32 may be used but to obtain a finer adjustment, a slot is more desirable as any angular position of the weight 10 may be obtained and for slight movement of the weight it is not necessary to remove the bolt. A washer 34 is shown between the bolt head and felloe flange and may be of a size to cover the slot 28. Thus by loosening the bolt 32 small adjustments may be had and by removing the bolt 32 the weight may be circumferentially moved in the felloe channel 14 within wide limits. The bolt when tightly engaged securely holds the weight in any desired position and prevents rattle.

In balancing a wheel it is important to balance the wheel with its tire mounted thereon for there are certain variations in each tire which affect the balance of the wheel. It is also necessary to balance the wheel after the tire has been removed and again applied to the wheel for if one of the rim bolts is tighter than others the wheel would be out of balance. Bp the use of my construction it is easy to balance wheels and tires when assembled for running. It is not necessary to remove the tire to balance the wheel and the weights are invisible.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In an automobile wheel comprising a channel felloe having an opening in one of its side flanges, a weight provided with a plurality of apertures adapted to slide in the channel of said felloe, and means extending through the opening in said side flange adapted to engage one of the apertures in said weight to retain the latter in one of several positions.

2. In an automobile wheel comprising a channel felloe having an opening in one of its side flanges, a tire rim on said felloe and a valve stem in said felloe diametrically opposite said opening, a weight provided with a plurality of screw threaded apertures adapted to slide in the channel of said felloe between said tire rim and said felloe, and a bolt extending through the opening in said side flange adapted to engage one of the screw threaded apertures in said weight to retain the latter in one of several positions.

3. In an automobile wheel comprising a channel felloe, a plurality of weights slidably mounted in the channel of said felloe, and means outside said felloe for securing said weights in one of several circumferential positions.

4. In an automobile wheel comprising a channel felloe having an opening in one of its side flanges, a weight provided with an opening in one of its side walls and adapted to slide in the channel of said felloe, and means extending through said opening in the felloe side flange adapted to retain said weight in one of several positions.

5. A weight having a body portion arc shaped in side elevation to conform to the circumference of a wheel, a channel in the concave side of said body portion, and an opening in one side of said body portion adapted to receive a retaining member.

ERNEST R. TIETZ.